Patented Oct. 24, 1950

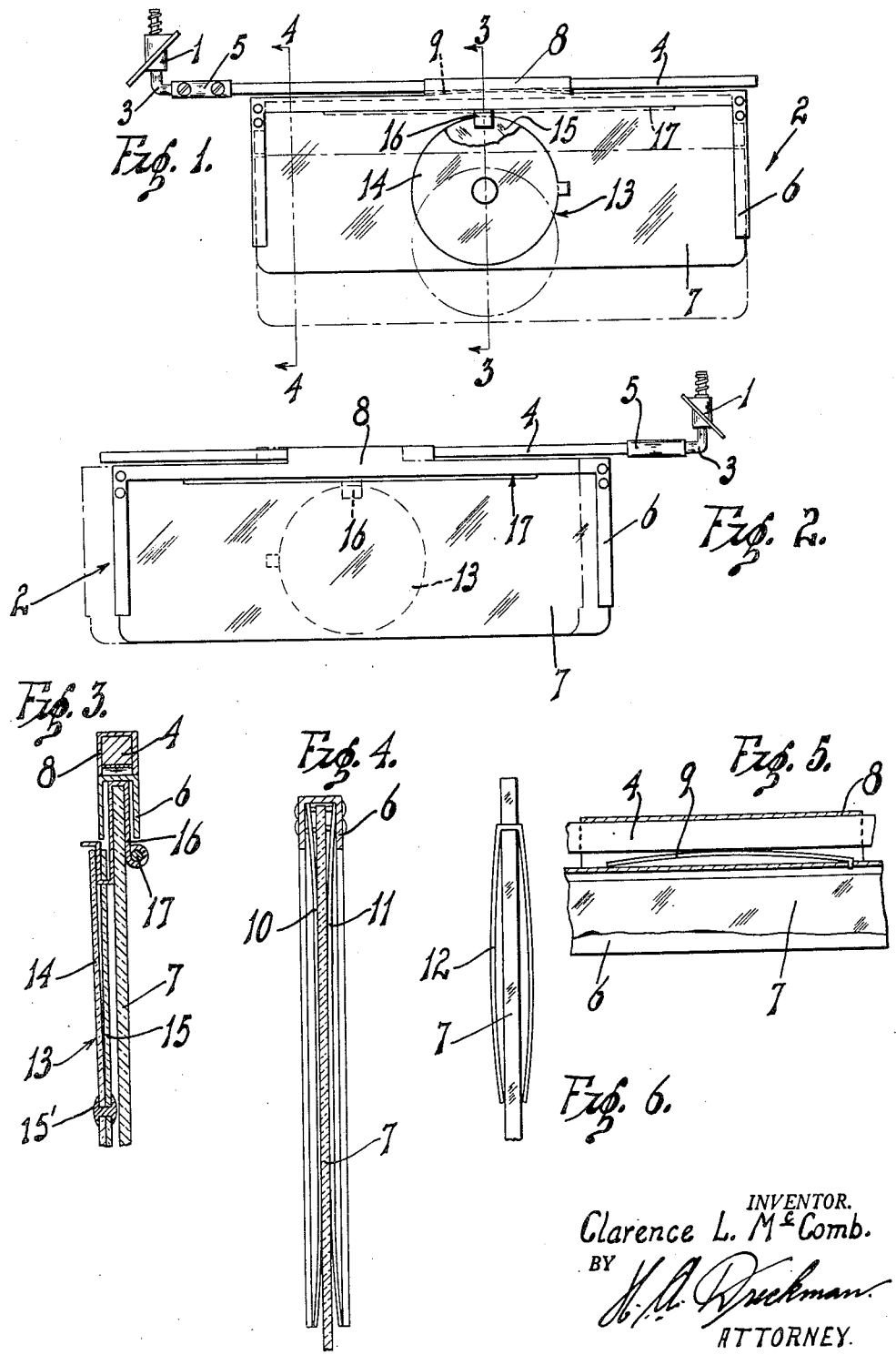

2,526,889

UNITED STATES PATENT OFFICE 2,526,889

VEHICLE SUNSHADE

Clarence L. McComb, Lynwood, Calif.

Application March 15, 1948, Serial No. 14,972

5 Claims. (Cl. 296—97)

This invention relates to a vehicle sun shade of the type which is mounted to the roof of the vehicle, and on the inside, and which is adjustable, both horizontally and vertically, so that the driver of the vehicle, or a passenger, may adjust the shade to eliminate the direct rays of the sun.

An object of my invention is to provide a novel sun shade of the character stated, which comprises a novel means of mounting the shade so that it is adjustable both horizontally and vertically and is quickly and easily adjusted by the user.

Still another object is to provide a novel sun shade, including a polarized disc which is adjustable over the sun shade so that the rays of the sun may be entirely eliminated in one area of the shade.

A feature of my invention is to provide a novel sun shade of the character stated, in which the polarized disc may be adjusted by the user in a horizontal plane.

Other objects, advantages and features of invention may appear from the accompanying drawing, the subjoined detailed description and the appended claims.

In the drawing:

Figure 1 is a rear elevation of my vehicle sun shade.

Figure 2 is a front elevation of the same.

Figure 3 is an enlarged sectional view taken on line 3—3 of Figure 1.

Figure 4 is an enlarged sectional view taken on line 4—4 of Figure 1.

Figure 5 is a fragmentary vertical sectional view of the center mounting sleeve of my sun shade.

Figure 6 is a fragmentary end view of the sun shade showing a modified form of spring clip.

Referring more particularly to the drawing, the numeral 1, indicates a fitting by means of which the sun shade 2, is attached to the roof of the vehicle. This fitting is usual and well known, and includes a bent pin 3, to which the sun shade 2, is attached. My sun shade 2, includes a bar 4, which may be square as shown, or may be constructed as a half round section, or other form if desired. The bar 4, has a sleeve 5, mounted on one end thereof, and the sleeve 5, is rotatable on the pin 3, so that the sun shade may be rotated around the center line of the sleeve 5, to move it upwardly against the roof of the vehicle.

A frame 6, is preferably shaped to encompass three sides of a rectangle, the fourth side, or bottom, being left open to receive the transparent or translucent shade, or pane 7. The frame 6, further includes a sleeve 8, which is integrally formed with the frame, and this frame is shaped to slide on the bar 4. A leaf spring 9, is mounted between the frame 6, and the bottom of the bar 4, and within the sleeve 8, thus frictionally engaging the bar to hold the frame in whatever position it may be placed along the bar 4.

The shade or pane 7, is slidably mounted in the frame 6, that is, the pane is movable vertically in the frame, and can be adjusted in a vertical plane by the user to suit his convenience. The pane 7, is formed of a suitable transparent or translucent material, many substances of this character being now on the market. A pair of leaf springs, 10, 11, are mounted in the frame 6, at both ends thereof, and these springs press against the shade or pane, 7, to hold it in whatever position it may be placed within the frame. If desired, the leaf springs 10, 11, may be replaced by a spring clip 12, which is secured to the pane 7, at both ends thereof.

A disc 13, formed of polarized material is mounted on the pane 7, and is adjustable horizontally on the pane. The disc 13, preferably consists of two concentric discs, each of which are polarized in a different plane so that the one disc 14, can be rotated relative to the stationary disc 15 about the pivot 15', thus entirely cutting out the rays of light if the user so desires. The stationary disc 15, is mounted on a clip 16, which extends over the top of the pane 7, and encircles a rod 17, fixedly attached to the front face of the pane 7. It will thus be evident that the disc 13, can be moved horizontally over the face of the pane 7, so that the user can place the disc in a position to entirely eliminate the direct rays of the sun, or a similar spot glare.

Having described my invention, I claim:

1. A vehicle sun shade comprising a bar, attaching means on said bar to secure said bar to the vehicle, a frame slidably mounted on said bar, and a translucent pane slidably mounted in said frame, to move vertically relative thereto, and a polarized disc mounted on said pane.

2. A vehicle sun shade comprising a bar, attaching means on said bar to secure said bar to the vehicle, a frame slidably mounted on said bar, and a translucent pane slidably mounted in said frame, to move vertically relative thereto, and a polarized disc adjustably mounted on said pane, means on said pane to which said disc is attached, whereby the disc is adjusted horizontally of said pane.

3. A vehicle sun shade comprising a bar, attaching means on said bar to secure said bar to the vehicle, a frame slidably mounted on said bar, and a translucent pane slidably mounted in said frame, to move vertically relative thereto, and a polarized disc mounted on said pane, a spring mounted in the frame and bearing against said bar, and spring means in the frame engaging said pane to hold said pane in adjusted position.

4. A vehicle sun shade comprising a bar, attaching means on said bar to secure said bar to the vehicle, a frame slidably mounted on said bar, and a translucent pane slidably mounted in said frame, to move vertically relative thereto, and a polarized disc adjustably mounted on said pane, means on said pane to which said disc is attached, whereby the disc is adjusted horizontally of said pane, a spring mounted in the frame and bearing against said bar, and spring means in the frame engaging said pane to hold said pane in adjusted position.

5. A vehicle sun shade comprising a bar, a frame, a sleeve on the frame, said sleeve being slidable on the bar, a spring on the frame engaging the bar to hold said frame in position on said bar, a pane slidably mounted in said frame to move vertically relative thereto, spring means in the frame engaging the pane to hold said pane in adjustable position relative to the frame, a polarized disc, a rod means mounting said rod on said pane, and means on the disc encircling the rod whereby said disc is slidably mounted on said rod.

CLARENCE L. McCOMB.

REFERENCES CITED

The following references are of record in the file of this patent:

UNITED STATES PATENTS

| Number | Name | Date |
|---|---|---|
| 2,102,632 | Land | Dec. 21, 1937 |
| 2,201,377 | Schoenheit | May 21, 1940 |
| 2,235,421 | Devine | Mar. 18, 1941 |
| 2,239,240 | Magness | Apr. 22, 1941 |
| 2,422,863 | Stroth | June 24, 1947 |
| 2,423,322 | Hurley | July 1, 1947 |

FOREIGN PATENTS

| Number | Country | Date |
|---|---|---|
| 335,720 | Great Britain | Oct. 2, 1930 |